May 22, 1956      H. M. STUELAND      2,746,624
ATTACHMENT FRAME FOR TRACTORS
Original Filed March 29, 1951      4 Sheets-Sheet 1
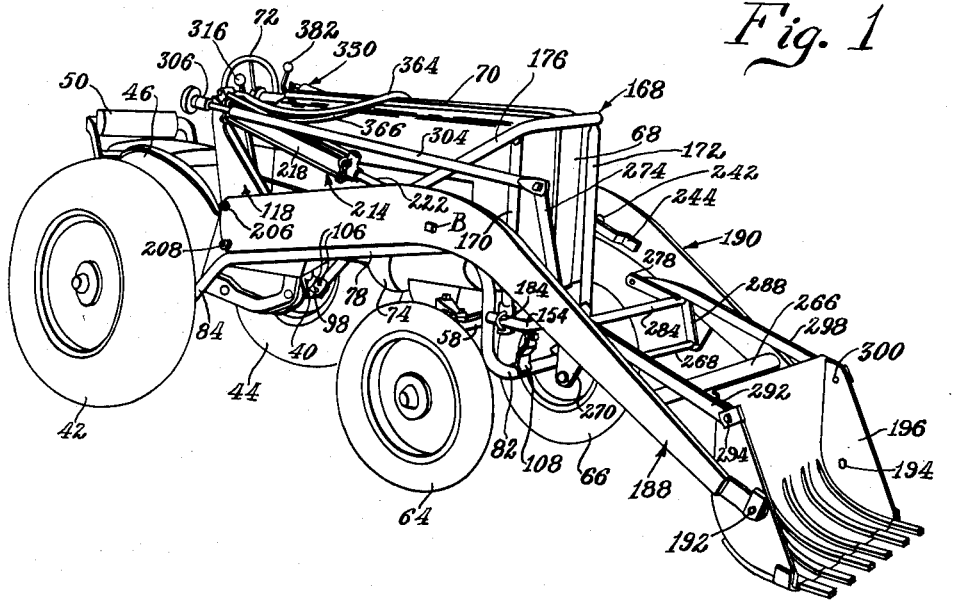
Fig. 1
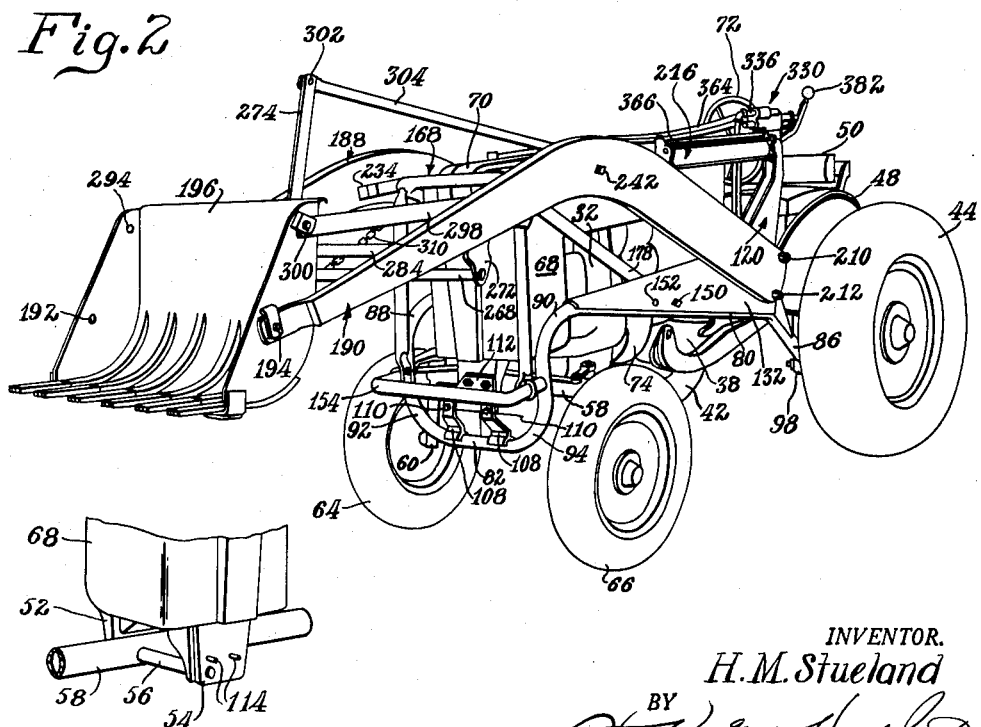
Fig. 2
Fig. 11
INVENTOR.
H. M. Stueland
BY
Attorneys May 22, 1956     H. M. STUELAND     2,746,624
ATTACHMENT FRAME FOR TRACTORS
Original Filed March 29, 1951     4 Sheets-Sheet 2
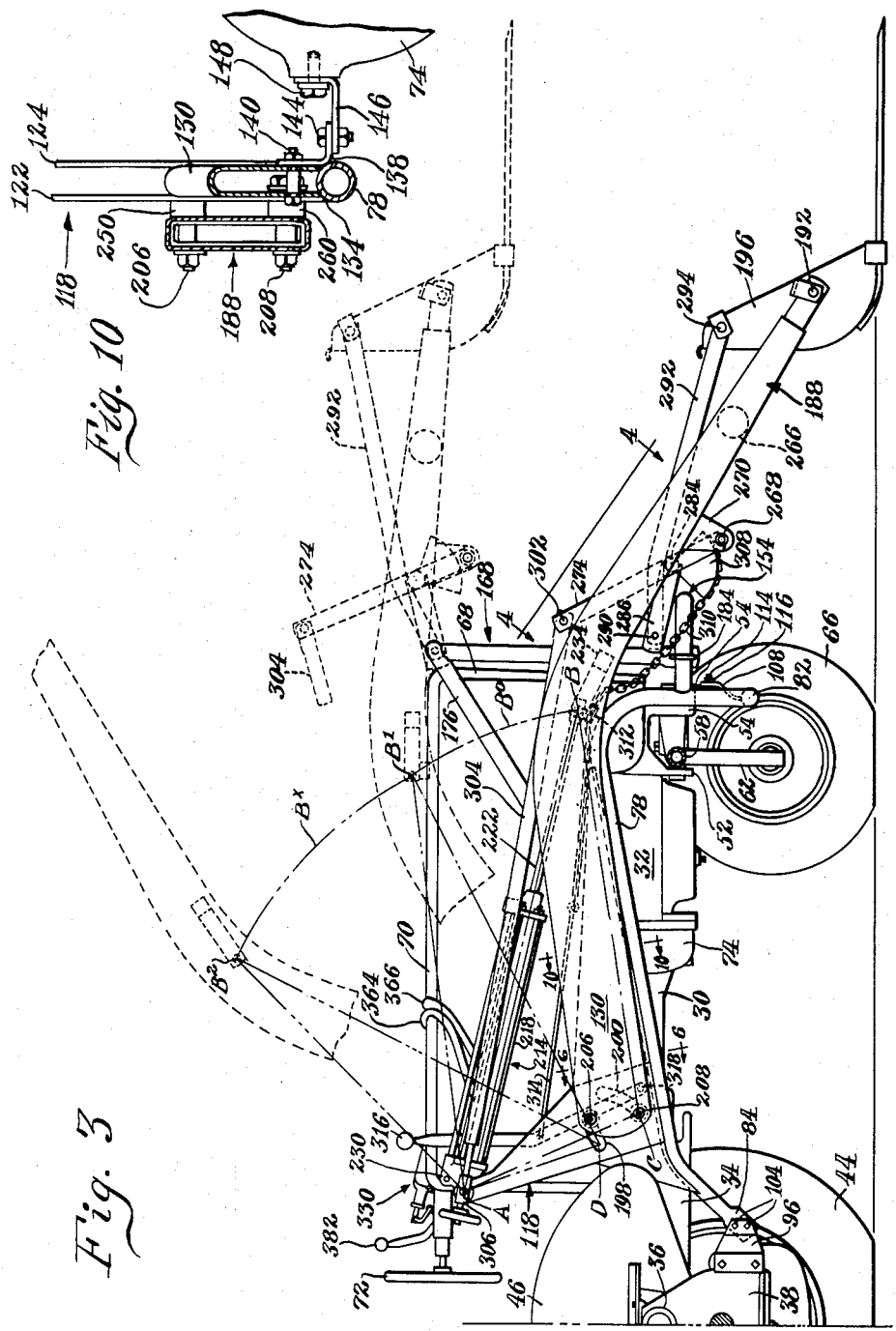
INVENTOR.
H. M. Stueland
BY
Attorneys

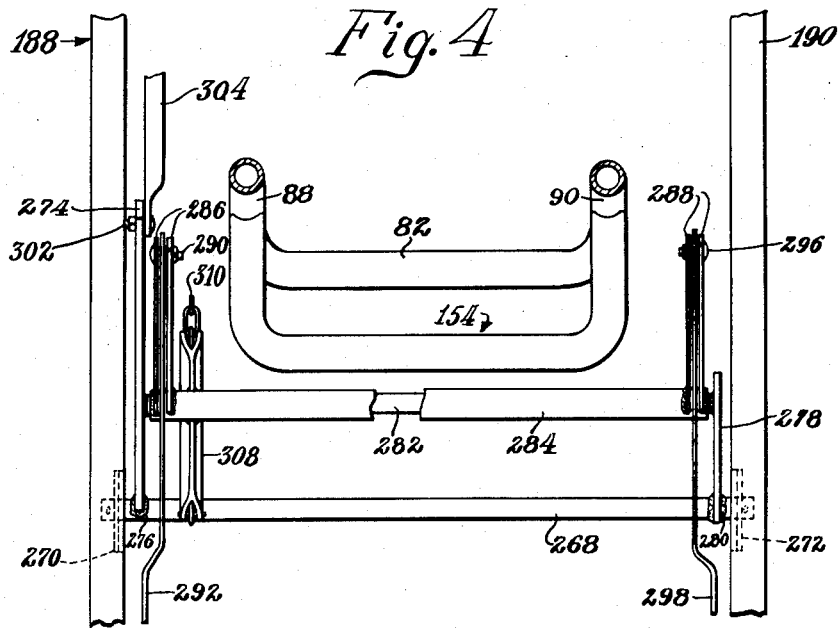
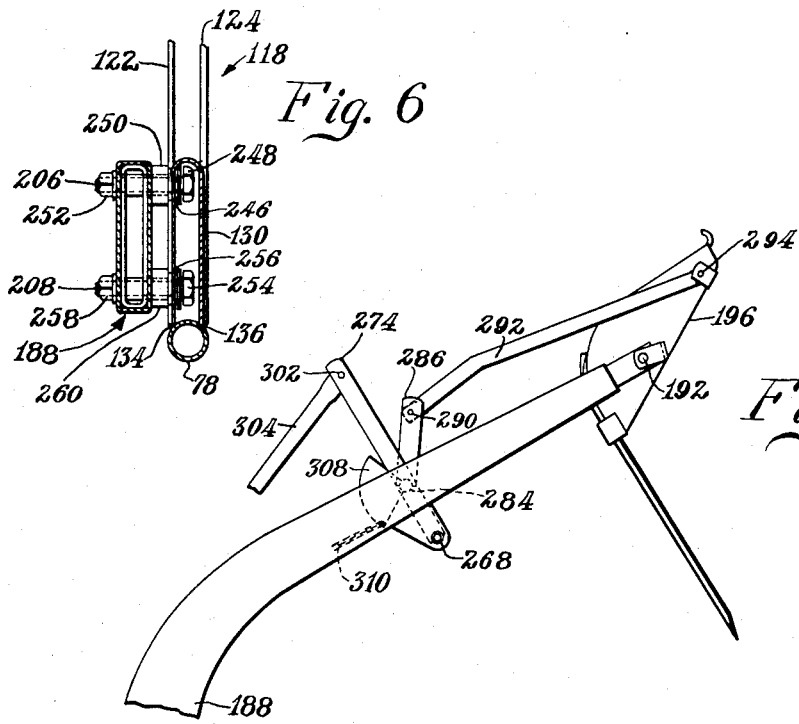

May 22, 1956 — H. M. STUELAND — 2,746,624
ATTACHMENT FRAME FOR TRACTORS
Original Filed March 29, 1951 — 4 Sheets-Sheet 4
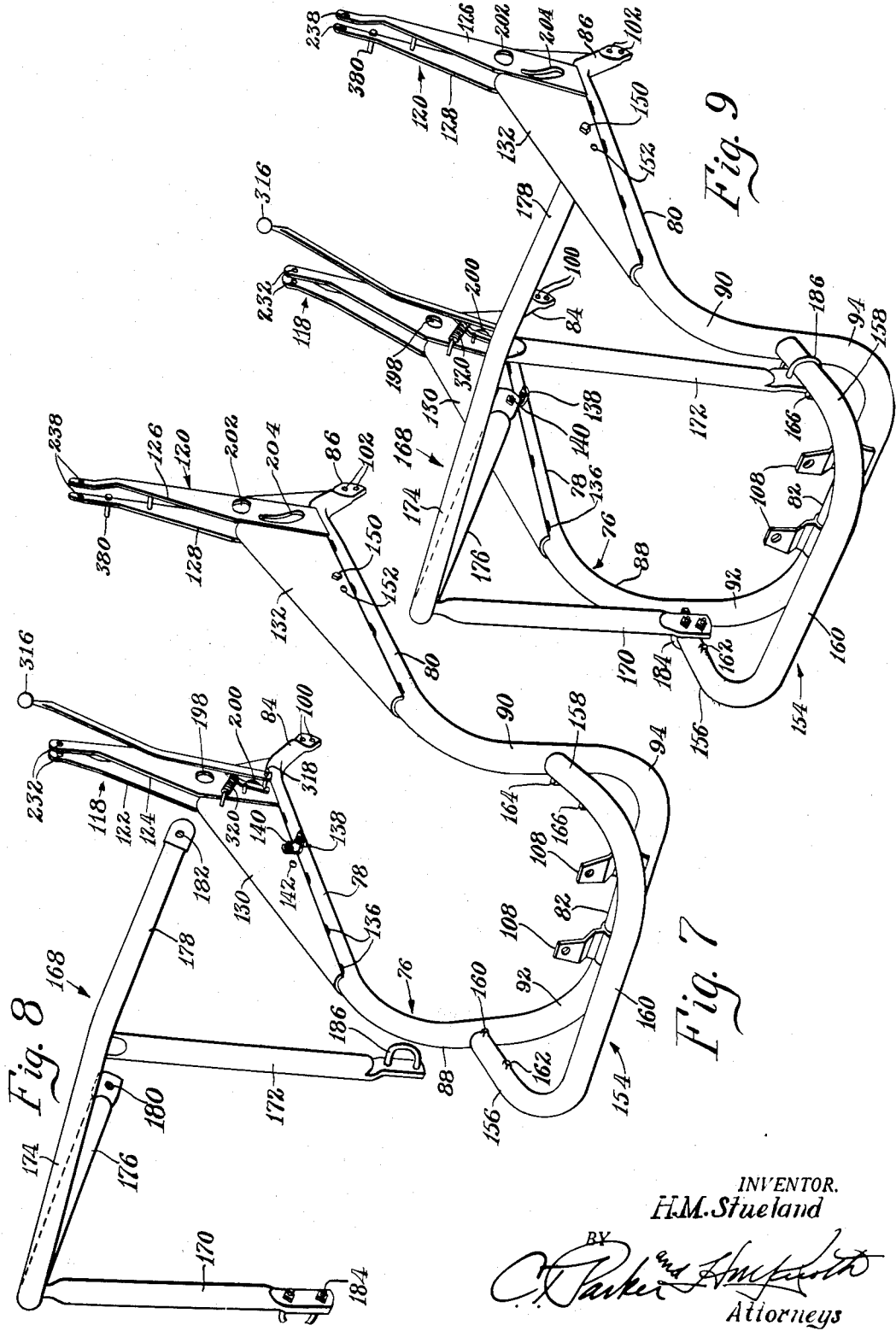
INVENTOR.
H. M. Stueland
Attorneys ial No. 218,105,
United States Patent Office 2,746,624
Patented May 22, 1956

2,746,624

ATTACHMENT FRAME FOR TRACTORS

Harold M. Stueland, East Moline, Ill., assignor to Deere & Company, Moline, Ill., a corporation of Illinois Original application March 29, 1951, Serial No. 218,105, now Patent No. 2,679,943, dated June 1, 1954. Divided and this application June 29, 1953, Serial No. 364,715

5 Claims. (Cl. 214—131)

This application is a division of copending application, Serial No. 218,105, filed March 29, 1951, now U. S. Patent 2,679,943, and the invention relates to a load-moving machine and more particularly to such machine as embodied in a tractor-mounted loader of the type that has found such wide acceptance on farms for the handling of manure, dirt, gravel, and other materials.

A typical tractor-mounted loader comprises a load-bearing element in the form of a boom, usually comprising a pair of longitudinal arms, one at each side of the tractor, and connected to the tractor for swinging of the front end of the boom from a lowered or working position to a raised or loading position. The material-handling element comprises a scoop or bucket which is preferably carried by the forward end of the boom and has a level position while digging. The scoop is mounted for swinging to a tilted position so that the material carried thereby may be dumped into a vehicle or at some location apart from the place from which it was dug.

The principal object of the invention is to provide a novel supporting frame structure by means of which the loader can be carried on any one of several tractors of a certain size and power range. In this respect, it is an object to adapt the frame for ready attachment to and detachment from the tractor so that the tractor may be used for other purposes when not carrying the loader. It is an object of the invention to utilize a carrying frame which is mounted on the tractor by means of what may be called a three-point suspension. It is an object of the invention to provide a novel frame structure having tubular frame members at the rear ends of which are upright supports for carrying the hydraulic cylinders or equivalent power means for the loader boom.

The invention has for another object the provision of a novel frame structure including protective members or bumpers in the form of U-shaped elements for preventing damage to the front end of the tractor in the event of collision between the tractor and the vehicle or vehicles being loaded.

The foregoing and other important objects and desirable features inherent in and encompassed by the invention will become apparent as the invention is fully disclosed in the following detailed description and accompanying sheets of drawings in which:

Figure 1 is a three-quarter perspective view of the tractor-mounted loader as seen from the right side, the bucket being shown in lowered or digging position;

Figure 2 is a three-quarter perspective view taken from the opposite side of the machine, with the bucket shown in an intermediate raised position;

Figure 3 is a side elevational view, with portions of the tractor omitted, and illustrating in full lines the lowered or digging position of the loader and in broken lines an intermediate position and a high position of the loader boom;

Figure 4 is a plan view, on an enlarged scale, of a forward portion of the boom and bucket control means as seen along the line 4—4 of Figure 3;

Figure 5 is a side elevational view of the forward portion of the boom and bucket, showing this bucket in dumped position, the view being drawn to the same scale as that of Figure 3;

Figure 6 is an enlarged transverse fragmentary sectional view taken on the line 6—6 of Figure 3;

Figure 7 is a three-quarter perspective view from the left side of the supporting frame structure by itself;

Figure 8 is a similar perspective view of one of the protective means attachable to the frame structure of Figure 7;

Figure 9 is a perspective view showing the assembly of the structures of Figures 7 and 8;

Figure 10 is an enlarged fragmentary transverse sectional view taken substantially on the line 10—10 of Figure 3;

Figure 11 is a fragmentary perspective view showing the forward portion of the tractor and the means by which the transverse axle structure is mounted thereon.

In general

Reference herein to the machine as having right- and left-hand sides is made with respect to the position of an observer standing behind the machine and facing forwardly. For the purposes of brevity, there will also be used such expressions as "front" and "rear" and "upper" and "lower." It should be understood, however, that the description in this respect is not intended to mean that the parts cannot be otherwise arranged.

Also, the invention is disclosed in connection with a tractor of one well-known type. Obviously, the general principles of the invention may be utilized in connection with loaders mounted on other tractors or even with loaders mounted on supporting frames other than the base provided by a tractor.

Tractor construction

The tractor comprises a longitudinal body 30 having at its forward end an internal combustion engine 32 and at its rear end a transmission casing 34. The transmission casing is joined to a transverse rear axle structure 36 having at its opposite ends right- and left-hand depending housings 38 and 40. The rear axle structure is carried by right- and left-hand traction wheels 42 and 44. Right- and left-hand fenders 46 and 48 delineate opposite sides of an operator's station including a seat 50.

The forward end of the internal combustion engine 32 includes a pair of fore-and-aft spaced apart supports 52 and 54 (Figures 3 and 11) which between them carry a longitudinal pivot member 56 serving as a pivotal mounting for a transverse front axle 58. This axle is of arched construction and includes right- and left-hand upright members 60 and 62 rigidly joined at their upper ends to the transverse axle 58 and journaling at their lower ends right- and left-hand wheels 64 and 66 respectively. The support 54 comprises a mounting portion located substantially midway between the front wheels 64 and 66 and above the rolling axis thereof for purposes to presently appear.

The tractor further includes a forward upright grille 68 behind which extends a longitudinal hood 70 for enclosing the engine 32. The hood terminates at its rear end just forwardly of the operator's seat 50. The front wheels 64 and 66 are, of course, steerable, and this result is achieved by the provision of a conventional steering wheel 72 located forwardly of the operator's seat 50.

The general nature of the tractor construction is such that the rear traction wheels 42 and 44 are relatively widely spaced apart, as are the steerable front wheels 64 and 66, and the longitudinal body 30–32–34 is substantially centrally disposed between the right- and left-hand wheels.

The forward part of the body part 30 is joined to the rear part of the internal combustion engine 32 by conventional structure including a clutch housing 74, the importance of which will be presently brought out.

*Frame structure*

The frame is best shown by itself in Figure 7 and is designated generally by the numeral 76. This frame is of elongated U-shaped construction as viewed from above and has right- and left-hand longitudinal frame members 78 and 80 and a transverse bar or bight 82. The rear ends of the frame members 78 and 80 are turned downwardly respectively at 84 and 86 and the forward portions of these frame members are curved downwardly respectively at 88 and 90, further joining the transverse bar or bight 82 in curves 92 and 94. Thus, the bight 82 and the rear mounting portions 84 and 86 are considerably below the general level of the frame as determined by the frame members 78 and 80.

The rear portions 84 and 86 are provided respectively with means for the mounting thereof on the depending housings 38 and 40 of the tractor. This means comprises right- and left-hand mounting plates 96 and 98, the rear end frame portions 84 and 86 being respectively apertured at 100 and 102 to receive removable securing means which may be in the form of a plurality of bolts 104 and 106 (Figures 1 and 3).

As best seen in Figure 3, the mounting portions 84 and 86 of the frame 76 are somewhat below the general level of the tractor frame 30–32–34 and the longitudinal members 78 and 80 incline slightly forwardly and upwardly relative to the horizontal plane of the tractor body so that the forward portions 88 and 90 curve forwardly and downwardly about the transverse axle 58, placing the transverse bar or bight 82 ahead of and at a level below the transverse axle. The transverse bar carries substantially midway between its ends as determined by the curved portions 92 and 94 a pair of apertured mounting members 108 which receive bolts 110 for connecting the members 108 to a mounting plate 112. This plate is rigidly mounted on the front face of the tractor mounting portion 54 by means of a pair of securing means in the form of mounting studs 114 (Figure 3). Nuts 116 are received by the studs 114 to secure the mounting plate 112 in place.

The longitudinal frame members 78 and 80 of the frame 76 are provided at their rear ends with upright supports 118 and 120 respectively. The frame is tubular in section and the supports preferably comprise laterally spaced apart plates 122—124 and 126—128, spaced apart according to the transverse dimension of the tubular section. These plates are rigidly welded along their lower edges to upper portions of the longitudinal frame members and the supports are suitably braced by forwardly tapering brace members 130 and 132, respectively. As best shown in Figures 6 and 10, the brace 130 is of inverted U-shaped section welded, as at 134 and 136, along its lower edges to upper portions of the proximate longitudinal frame member 78. The other brace 132 is similarly constructed and similarly related to the longitudinal frame member 80. Thus, in addition to adequately supporting the supports 118 and 120 relative to the frame structure 76, the braces 130 and 132 serve to enhance the general appearance of the frame.

The frame 76 is further secured to the tractor at portions midway between its front and rear ends by means to be presently described. The right-hand side of the frame is provided with a mounting bracket 138 secured by a bolt 140 to one of a pair of transverse apertures 142, only the forward one of which is visible because the bolt 140 occupies the rear one. The mounting bracket 138 is in the form of an angle which may be secured by a bolt 144 to a second angle 146 which in turn has an apertured flange through which a cap screw 148 passes to be threaded into the proximate side of the tractor clutch or bell housing 74 (Figure 10). The other side of the frame 76 may be similarly attached by symmetrical mounting means (not shown). There is shown, at the left-hand side of the frame, a bolt 150 which corresponds to the bolt 140 and a forwardly spaced transverse aperture 152 which corresponds to the aperture 142. The apertures 142 and 152 are adapted to respectively receive the bolts 140 and 150 for carrying the mounting bracket in a forward position for mounting of the frame 76 on a different type of tractor, all in keeping with the idea of providing a frame that is universally adaptable to many types of tractors within a certain designated class, particularly tractors of the so-called medium size and medium power range.

A further part of the frame 76 comprises a bumper 154, which is in the form of a U as viewed from above having opposite, longitudinal short legs 156 and 158 and a transverse bar or bight 160. The rear end portions of the legs 156 and 158 are rigidly secured respectively to the upright portions of the frame 76 between the curved portions 88—92 and 90—94. As best seen in Figure 3, the bumper 154 extends horizontally forwardly at about the level of the transverse axle 58. The forward projection of the bumper 154 ahead of the grille 68 affords ample protection to the grille in the event of collision between the loader and a vehicle having relatively low sides, as the conventional manure spreader.

The leg 156 of the member 154 has on the inner side thereof a pair of fore-and-aft spaced apart lugs or abutments 160 and 162. A similar pair of lugs 164 and 166 is provided on the other leg 158. These lugs are selectively usable in the mounting on the frame 76 of an auxiliary protective means in the form of a grille guard designated generally by the numeral 168, best shown by itself in Figure 8. The grille guard may be considered a pair of angularly related U's having a common bight. The upright section of the grille guard comprises a pair of laterally spaced upright supports 170 and 172 rigidly cross-connected at their upper ends by a transverse bar portion 174. This bar is a bight common to a pair of rearwardly and downwardly inclined supporting legs 176 and 178, having rear portions apertured respectively at 180 and 182. The right-hand upright 170 is provided with a pair of apertures which carry a U-bolt 184. A similar U-bolt 186 is carried by the other leg 172 at its bottom.

These U-bolts serve as means for mounting the lower portion of the grille guard 168 on the bumper 154. As best shown in Figure 9, the lower portions of the uprights 170 and 172 lie respectively inside the bumper legs 156 and 158, and the U-bolts 184 and 186 respectively encircle these bumper legs.

In one position of the grille guard 168 on the bumper 154 and frame 76, the rear portions of the uprights 170 and 172 respectively about the abutments or lugs 160 and 164 and the apertures 180 and 182 receive the bolts 140 and 150 in the side braces 130 and 132. By this means the grille guard becomes substantially an integral part of the frame 76 and affords protection to upper portions of the tractor grille 68. The grille guard may be adjustably positioned farther forwardly relative to the frame 76 by installing the grille guard so that the rear portions of the uprights 170 and 172 lie ahead of the respective lugs 162 and 166, in which case the bolts 140 and 150, or additional bolts, may be passed through the apertures 142 and 152 in the side braces 130 and 132 and through the apertures 180 and 182 in the grille braces 176 and 178, respectively.

*Boom structure and mounting thereof*

The boom structure for the loader comprises right- and left-hand longitudinal load-bearing elements or arms 188 and 190, each of which is pivoted at its rear end to the frame structure 76 by means to be hereinafter described. The boom arms have at their forward ends means in the form of a pair of transversely coaxial trunnions 192 and 194 to provide means for tiltably mounting a load-carrying element in the form of a bucket or scoop 196. The bucket may be of any conventional construction, although certain details thereof are significant, as will be brought out below.

For the purposes of general description, reference will be had to the separate components at each side of the frame structure 76 for mounting the rear ends of the boom arms 188 and 190. The plates 122 and 124 of the upright support 118 are provided with upper and lower guide means in the form of arcuate slots 198 and 200. Similar arcuate slots or guide means 202 and 204 are provided in the plates 126 and 128 of the upright support 120. The rear end of the right-hand boom arm 188 has upper and lower pivot elements 206 and 208 respectively cooperative with the slots 198 and 200; and the rear end of the left-hand boom arm 190 is provided with upper and lower pivot elements 210 and 212 respectively cooperative with the slots 202 and 204 in the left-hand upright support 120.

The boom structure 188—190 is raised by power supplied by a pair of selectively expansible and contractible force-transmitting means, here in the form of a pair of fluid motors 214 and 216. The motor 214 is in the form of a cylinder 218 having a piston (not shown) to which is connected a piston rod 222. The motor 216 is a duplicate of the motor 214.

The upper or rear end of the cylinder 218 is provided with a mounting portion 230 by means of which and transversely aligned apertures 232 at the upper end of the right-hand upright support 118 a pivotal connection is made on a transverse axis designated by the letter A in Figure 3. An intermediate portion of the inside face of the right-hand boom arm 188 has rigidly fixed thereto a mounting bracket 234 by means of which a second pivotal connection is effected at B (Figure 3) between the boom arm and the free end of the piston rod 222.

The left-hand cylinder 224 is similarly mounted at the upper end of the left-hand upright support 120. The free end of the left-hand piston rod 228 is pivotally connected at 242 to a bracket 244 fixed to the inside face of the left-hand boom arm 190. To the extent thus far described, both booms 198 and 190 may be considered identical, as may be the mounting and arrangement of the motors 214 and 126. In the description to follow, only the right-hand boom arm 188 and its mounting on the upright support 118 of the frame 76 will be considered, it following from what has been said above that the arrangement is repeated at the opposite side of the machine.

The connection of the right-hand boom arm 188 to the lower portion of the upright support 118 may be best seen in Figure 6. The upper pivot element 206 comprises an anti-friction roller 246 which rolls along or is guided by the arcuate guide means or upper slot 198. This roller is carried on a transverse mounting pin or bolt 248 on which is carried a spacer 250 for maintaining the spacing between the outer plate 120 of the support 118 and the inside face of the boom arm 188. The bolt passes completely through the upper portion of the boom arm 188 and is secured by a nut 252. The lower pivot element 208 is of similar construction, comprising a bolt 254, a lower roller 256 which travels in the lower guide means or arcuate slot 200, and a securing nut 258. A spacer 260, similar to the spacer 250, is also provided.

The rear portion of the lower arcuate slot 200 receives and supports the lower pivot element 208 when the boom arm 188 is in its lowered or digging position. Thus, the lower pivot element 208 is carried at a lower and rearward portion of the slot 200. The center of the pivot element 208 is designated by the letter C in Figure 3.

Thus, when the boom arm 188 is in the full-line position of Figure 3, the points A, B, and C lie respectively at the apices of a triangle in which: The distance AC equals the distance between the presently effective pivot 208 of the boom arm and the permanent pivot of the cylinder 218; the distance AB represents the extended length of the cylinder 218 and piston rod 222; and the distance CB is a fixed distance between the pivotal connection of the piston rod 122 to the boom arm 188 and the presently effective pivot element 208. Now, when the fluid motor 214 is contracted, the arm 188 swings about the point C and the point B moves on the arc B° until it reaches approximately the point B¹. The point C remains fixed, since the pivot element 208 seats at the rear of the lower slot 200. In the meantime, the upper pivot element 206 travels rearwardly and ultimately seats at the rear of the upper guide means or slot 198. The position of the boom 188 when these conditions obtain is indicated by the intermediate dotted-line position in Figure 3.

When the upper pivot element 206 reaches the rear of the upper slot 198, a new point D is established (Figure 3). Whereas the prior effective triangle was represented by ABC, a new triangle AB¹D is now effective. As the fluid motor 214 is further contracted, the boom arm 188 moves upwardly, the point B now traveling along an arc Bˣ to a high or ultimate point B². During this range of movement, the pivotal connection of the boom arm 188 to the frame 76 is at the point D. Also, during this range of movement, the lower pivot element 208 is riding upwardly and forwardly in the lower slot 200. When the boom structure is in its lowered position, as shown in full lines in Figure 3, the upper pivot element 206 does not positively engage a forward portion of the slot 198. Nor does the lower pivot element 208 positively engage an upper or forward portion of the lower slot 200 when the boom structure is fully raised. Ample clearance is provided at both of these points in order to prevent damage to the upright support 118, because of the tremendous lever arm of the boom 188 relative to the lever arm determined by the spacing between the pivot elements 206 and 208.

As the boom 188 moves from its full-line position of its intermediate dotted-line position, substantially one half of the contracting stroke of the fluid motor 214 is used. In a preferred construction, the angular range of movement (B°) of the boom about the pivot C will be approximately 25 to 30 degrees. The subsequent range of movement, represented by the arc Bˣ, uses up the other half of the stroke of the motor 214, but this range is somewhat greater than the range B°, being, in a preferred construction, on the order of 45 to 50 degrees. The reason that the excess of travel is obtained through the arc Bˣ as compared to the movement through the arc B° is that the distance AD is considerably shorter than the distance AC. In other words, with the longer distance AC, the mechanical advantage of the system is greater with the triangle ABC than with the triangle AB¹D. This will be readily understood when it is considered that the motor 214 would have practically no effect if the point A were moved relatively close to the point C. In short, the effectiveness of the motor 214 would gradually approach zero as the point A approaches the point C. Conversely, an increase in distance between the points A and C would increase the force exerted by the motor 214. Stated otherwise, the fluid motor 214 is of uniform power application through a single stroke; yet, it is capable of exerting different forces through different portions of the strokes. It will be obvious that equivalent power means could be substituted and the same results obtained.

The reason why the power should be greater during the range of movement represented by the arc B° is that considerably more effort is required in digging or breaking loose the material from the pile and elevating it to the intermediate dotted-line position that is required for elevating the boom from the intermediate to the final position.

As the boom structure is lowered to its digging position, it pivots first about the point D and then about the point C after the lower pivot element 208 seats in the rear lower portion of the arcuate slot or guide means 200.

It will be noted also that the arcs B° and B<sup>x</sup> are not concentric, which they naturally would not be since they swing about the different pivots B and D. Nevertheless, these arcs will intersect at the point B¹, for obvious reasons.

Bucket mounting and control

As previously stated, the bucket 192 is mounted between the forward ends of the boom arms 188 and 190 by means of the trunnion means 192—194. It is desirable that the bucket be maintained level or substantially level between its digging position and its ultimate dumping position, so that material is not inadvertently dumped off until suitable tripping or actuating mechanism is operated. An improved control of this general nature is provided according to the present invention.

The forward portions of the boom arms 188 and 190 are substantially rigidified by a transverse tubular member 266 just rearwardly of the bucket 196. A rockshaft 268 parallels and is located rearwardly of the transverse member 266, being journaled at its opposite ends respectively in bearing brackets 270 and 272 secured respectively to the boom arms 188 and 190.

The rockshaft 268 has rigidly secured thereto at one end thereof an upstanding control arm 274. The connection between the arm 274 and the rockshaft 268 may be effected by welding, as at 276 (Figure 4). A shorter arm 278 is rigidly secured, as by welding at 280, to the opposite end of the rockshaft 268 and extends upwardly parallel to the arm 274. The upper end of the arm 278 and an intermediate portion of the arm 274 are rigidly cross connected, as by a shaft 282, which is parallel to the rockshaft 268 and which lies above the rockshaft. Sleeved on the shaft 268 is a second rockshaft in the form of a tubular member 284 having rigidly secured respectively to its opposite ends first and second pairs of arms 286 and 288. Since the arms 286 and 288 are rigidly connected to the sleeve or tubular member 284, the two arms will move in unison.

The free or upper ends of the arms 286 are pivotally connected at 290 to the rear end of a forwardly extending control link 292, the forward end of which is pivotally connected at 294 to a portion of the bucket 196 above the trunnion pivot 192. The opposite arms 288 are pivotally connected at 296 to the rear end of a forwardly extending link 298 that has its forward end pivotally connected at 300 to a point on the bucket in transverse alinement with the point 294.

The control arm 274 will control swinging of the entire structure comprising the arms 286, 288 and transverse member 284. In the normal or level position of the bucket 196, as shown in full lines in Figure 3, the arm 274 will be inclined rearwardly. The free or upper end of the arm 274 is pivotally connected at 302 to a rearwardly extending stabilizing link 304, the rear end of which is pivotally connected at 306 to the upper end of the right-hand upright support 118. The connection at 306 is coincident with the point A, which as previously stated, establishes the pivotal connection of the right-hand cylinder 218 to the upright support 118.

When the control arm 274 is in its full-line position as shown in Figure 3, the secondary control arm 286 has been moved rearwardly and downwardly so that the pivotal connection at 290 provides an over-center lock with relation to the centers at 284 and 294. As will be seen, the link 292 (as well as the symmetrical link 298) is arched to permit this result. Thus, the linkages 286—292 (or 288—298) establishes an over-center device which comprises in effect a prolongation of the stabilizing link 304. That is to say, as long as the over-center device is in the full-line position of Figure 3 the bucket may in effect be considered connected to the point A (or 306) by the linkage 304—286—292. The arrangement of the linkage just described is such that when the bucket is elevated to its intermediate position, it remains relatively level. However, since the point A is somewhat rearward of either of the points C or D, the bucket will be tipped slightly rearwardly about its trunnion axis 192—194 as the boom carries the bucket farther upwardly.

The over-center linkage 286—292 and 288—294 not only provides a prolongation of the stabilizing link 304 but serves also as means for effecting tilting of the bucket to its dumped position, as shown in Figure 5. For this purpose, the right-hand end of the transverse tubular 284 has rigidly secured thereto a depending sector 308 to the forward edge of which is connected a flexible actuating member in the form of a chain 310. This chain extends rearwardly and is loosely threaded through an eye member 312 carried on the inner face of the right-hand boom 188 just below the point B. The chain continues rearwardly and is connected to the forward end of a rod or link 314 which is in turn connected to an upright control lever 316. The lower end of the control lever 316 is pivoted at 318 to a lower portion of the inside plate 124 of the upright support 118. A return spring 320 (Figures 7 and 9) is provided for returning the lever 316 from a rearward position, to which it is moved to tighten the chain 310 when it is desired to break the over-center lock and to cause the member 284 and its associated arms 286 and 288 to rock in a clockwise direction as seen in Figure 3, thus projecting the links 292 and 298 forwardly to tilt the bucket about its trunnion axis 192—194. When the boom structure is lowered to the ground, the bucket will be returned to its digging position and the over-center lock will again be established.

Power system

The general arrangement of the hydraulic power system may, for present purposes and without in any way limiting the invention, be considered as conventional, involving a suitable constant displacement pump (not shown) driven in any adequate manner from the internal combustion engine 32. The low side of the pump is connected by a conduit 324 to a reservoir 326. The high pressure side of the pump is connected to a control device or distributing valve 330 controlled by a lever 382.

Summary

The foregoing disclosure, is, as previously stated, based upon a preferred embodiment of the invention for the purposes of efficiently achieving the desirable results as outlined above. The attachment frame 76 is suitable for mounting on tractors of various types within a certain size and power range. The selectively effective double pivotal mounting of the boom structure on the frame provides a simple arrangement in which adequate power is available at all times during all phases of the digging and loading operations.

Various other important features of the invention not specifically enumerated will undoubtedly occur to those versed in the art, as likewise will numerous modifications and alterations in the preferred embodiment of the invention, all of which may be achieved without departing from the spirit and scope of the invention as defined in the appended claims.

What is claimed is:

1. For a tractor of the type having a longitudinal body carried at its rear end on a wheeled, transverse rear axle having laterally spaced depending housings and at its forward end on a wheeled, transverse front axle, wherein the front end of the body includes a rigid body portion carrying an intermediate portion of the front axle structure on a longitudinal pivot: a loading machine frame comprising, when mounted on such tractor, an elongated frame of U-shape as viewed from above, having its open end at the rear and its bight at the front; each leg of the U comprising an elongated member having a rear end portion provided with means for rigid but detachable affixation to a low portion of the proximate depending housing of the rear axle, said member extending upwardly and forwardly from said rear end portion alongside the tractor to a point just above the front axle structure and curving thence downwardly ahead of the front axle to a level below said front axle, and thence extending transversely at said level as a rigid crossbar to join the other leg of said frame; means rigid on the crossbar and having provision for rigid but detachable affixation to the rigid body portion at the front of the tractor and independently of the tractor front axle pivot; a pair of upstanding supports, one adjacent and rigidly fixed to a rear end portion of each leg; and a pair of generally triangular brace means, one on each leg and having a lower edge running along and rigidly secured to the respective leg and terminating substantially at the aforesaid point at which said leg curves downwardly ahead of the front axle, each brace having a rear portion rigidly joined to the proximate support, and each brace having an upper edge inclining forwardly and downwardly from said support to join said lower edge substantially at the aforesaid point.

2. For a tractor of the type having a longitudinal body having rear and front ends and a clutch housing intermediate said ends and carried at its rear end on a wheeled, transverse rear axle and at its forward end on a wheeled, transverse front axle wherein the front end of the body includes a rigid body portion carrying an intermediate portion of the front axle structure on a longitudinal pivot: a loading machine frame comprising, when mounted on such tractor, an elongated frame of U-shape as viewed from above, having its open end at the rear and its bight at the front; each leg of the U comprising an elongated member having a rear end portion provided with means for rigid but detachable affixation to a low portion of the proximate side of the rear axle, said member extending upwardly and forwardly from said rear end portion alongside the tractor to a point just above the front axle structure and curving thence downwardly ahead of the front axle to a level below said front axle, and thence extending transversely at said level as a rigid crossbar to join the other leg of said frame; means rigid on the crossbar and having provision for rigid but detachable affixation to the rigid body portion at the front of the tractor; a pair of upstanding supports, one adjacent and rigidly fixed to a rear end portion of each leg; a pair of generally triangular brace means, one on each leg and having a lower edge running along and rigidly secured to the respective leg and terminating substantially at the aforesaid point at which said leg curves downwardly ahead of the front axle, each brace having a rear portion rigidly joined to the proximate support, and each brace having an upper edge inclining forwardly and downwardly from said support to joint said lower edge substantially at the aforesaid point; and mounting means on each leg intermediate the front and rear ends thereof and having provision for rigid but detachable affixation respectively to opposite sides of the tractor clutch housing.

3. An implement-carrying frame for a tractor having a longitudinal body including a forward radiator grille structure, comprising: a pair of longitudinal, parallel frame members of equal length, each turned downwardly at its front portion, and a transverse bar rigidly cross-connecting the bottoms of said turned-down front portions to provide an elongated U-shaped frame adapted to embrace the tractor body from the front with the longitudinal members lying respectively along the sides of the body and the crossbar across the front of the body and at a level below the grille structure; a bumper of U-shape as viewed from above, having the free ends of its legs fixed to the front portions of the longitudinal members at a level above that of the crossbar and extending horizontally forwardly therefrom, with the bight of the bumper parallel to and above the level of the crossbar; and a detachable grille guard comprising an upright frame of U-shape as viewed from the front and having the free ends of its legs detachably fixed to the legs of the bumper and its bight parallel to the bight of the bumper and at a level across the upper part of the grille structure, and a pair of longitudinal braces fixed to the upper portion of the grille guard and extending downwardly and rearwardly and detachably fixed respectively to the longitudinal frame members.

4. An implement-carrying frame for a tractor having a longitudinal body, comprising: an elongated supporting frame having opposite side members adapted to lie respectively at the sides of the tractor body; means providing a bumper at the forward end of the frame, including a pair of transversely spaced, horizontal elements projecting forwardly from the frame; a pair of longitudinally spaced lug means rigid on each element; a pair of longitudinally spaced connecting means on each side member rearwardly of the lug means; and a grille guard attachment having lower portions spaced apart transversely on the order of the spaced bumper elements and an upper part rising to a level above the bumper elements, detachable means respectively on said lower portions, and respectively engageable with the bumper elements, each detachable means being selectively cooperable with one lug means of each pair to provide for selective longitudinal positioning of the grille guard, and brace means connected to the upper part of the grille guard and extending back to the connecting elements, each brace means having detachable means selectively cooperative with one of the connecting means on the side means for attachment to the selected connecting means according to the selected longitudinal positioning of the grille guard as determined by the selected lug means.

5. For a tractor of the type having a longitudinal body carried at its rear end on a wheeled transverse rear axle and at its forward end on a wheeled transverse front axle, wherein the front end of the body includes a rigid body portion carrying an intermediate portion of the front axle structure on a longitudinal pivot: a loading machine frame comprising, when mounted on such tractor, an elongated frame of U shape as viewed from above, having its open end at the rear and its bight at the front; each leg of the U comprising an elongated tubular member having a rear end portion provided with means for rigid but detachable affixation to a low portion of the proximate side of the rear axle, said member extending upwardly and forwardly from said rear end portion alongside the tractor to a point just above the front axle structure and curving thence downwardly ahead of the front axle to a level below said front axle, and thence extending transversely at said level as a rigid crossbar to join the other leg of said frame; means rigid on the crossbar and having provision for rigid but detachable affixation to the rigid body portion at the front of the tractor; a pair of upstanding supports, one adjacent to and rigidly fixed to a rear end portion of each leg, each pair of upstanding supports comprising a pair of upright plate members lying respectively in fore-and-aft extending upright planes that include opposite sides of the associated tubular frame member; and a pair of generally triangular brace means, one on each leg and having a cross section in the form of an inverted U, including opposite side walls spaced apart on the order of the transverse dimension of the associated tubular frame member, each side wall having a lower edge running along and rigidly secured to the associated tubular frame member and terminating substantially at the aforesaid point at which said frame member curves downwardly ahead of the front axle, and said side walls of each brace being rigidly united with the plates of the associated support.

References Cited in the file of this patent

UNITED STATES PATENTS

| | | |
|---|---|---|
| 2,418,403 | Grabske | Apr. 1, 1947 |
| 2,479,048 | Machin | Aug. 16, 1949 |
| 2,489,629 | Ford | Nov. 29, 1949 |
| 2,495,144 | Simmonds | Jan. 17, 1950 |
| 2,517,582 | Lull | Aug. 8, 1950 |
| 2,660,322 | Richey | Nov. 24, 1953 |